(12) United States Patent
Ishikawa

(10) Patent No.: US 10,320,204 B2
(45) Date of Patent: Jun. 11, 2019

(54) ELECTRIC STORAGE APPARATUS AND ELECTRIC-STORAGE CONTROLLING METHOD

(71) Applicant: FUJITSU TEN LIMITED, Kobe-shi, Hyogo (JP)

(72) Inventor: Yukio Ishikawa, Kobe (JP)

(73) Assignee: FUJITSU TEN LIMITED, Kobe-shi (JP)

( * ) Notice: Subject to any disclaimer, the term of this patent is extended or adjusted under 35 U.S.C. 154(b) by 0 days.

(21) Appl. No.: 15/797,567

(22) Filed: Oct. 30, 2017

(65) Prior Publication Data

US 2018/0219391 A1 Aug. 2, 2018

(30) Foreign Application Priority Data

Jan. 31, 2017 (JP) ................................ 2017-016274

(51) Int. Cl.
| | | |
|---|---|---|
| H02J 7/00 | (2006.01) | |
| H01M 2/10 | (2006.01) | |
| H01M 10/44 | (2006.01) | |

(52) U.S. Cl.
CPC ......... *H02J 7/0026* (2013.01); *H01M 2/1072* (2013.01); *H01M 10/44* (2013.01); *H02J 7/0014* (2013.01); *H02J 7/0016* (2013.01); *H02J 7/0019* (2013.01); *H01M 2220/20* (2013.01); *Y02T 10/7005* (2013.01)

(58) Field of Classification Search
CPC ...... H02J 7/0026; H02J 7/0014; H02J 7/0019; H02J 7/0016; H01M 10/44; H01M 2/1072; H01M 2220/20; Y02T 10/7005
See application file for complete search history.

(56) References Cited

U.S. PATENT DOCUMENTS

| | | | | |
|---|---|---|---|---|
| 2004/0160213 | A1* | 8/2004 | Stanesti ................ | H02J 7/0018 320/116 |
| 2013/0127423 | A1* | 5/2013 | Liang .................. | H01M 10/443 320/136 |
| 2013/0300370 | A1* | 11/2013 | Hotta .................. | H01M 10/425 320/117 |
| 2015/0194707 | A1* | 7/2015 | Park .................. | H01M 10/4207 429/50 |
| 2016/0084912 | A1* | 3/2016 | Lee ...................... | G01R 31/362 324/426 |
| 2016/0094065 | A1* | 3/2016 | Motoichi .............. | H02J 7/0021 320/126 |

FOREIGN PATENT DOCUMENTS

| | | |
|---|---|---|
| JP | 2009-033936 A | 2/2009 |
| JP | 2013-240142 A | 11/2013 |
| JP | 2014-073051 A | 4/2014 |

* cited by examiner

*Primary Examiner* — Nha T Nguyen
(74) *Attorney, Agent, or Firm* — Oliff PLC

(57) ABSTRACT

An electric storage apparatus according to one exemplary aspect of an embodiment of the disclosure includes a battery unit, a determination unit, and a connection controlling unit. In the battery unit, a plurality of storage batteries is connected in parallel. Each of the storage batteries includes serially connected electric storage elements.

7 Claims, 7 Drawing Sheets

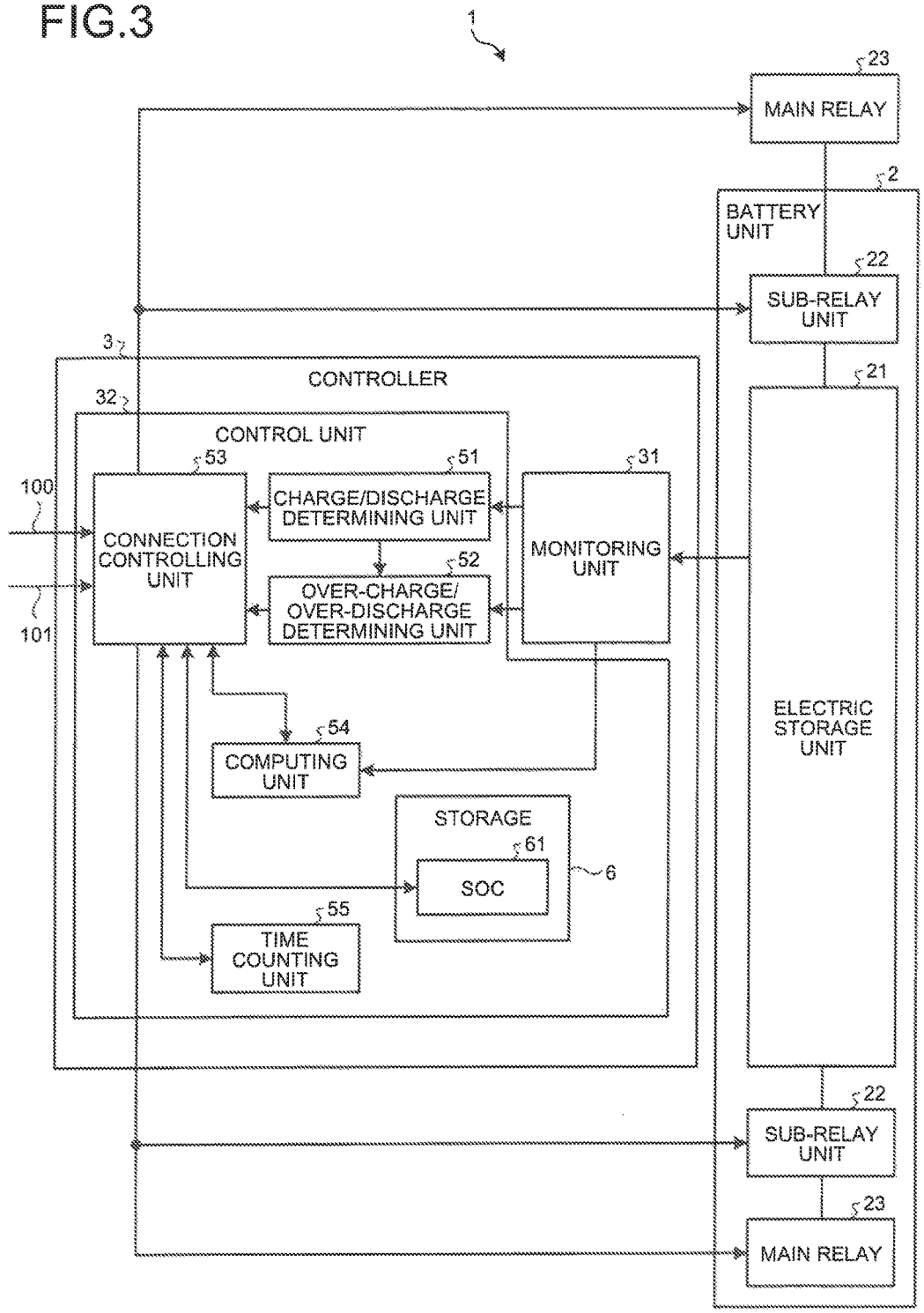

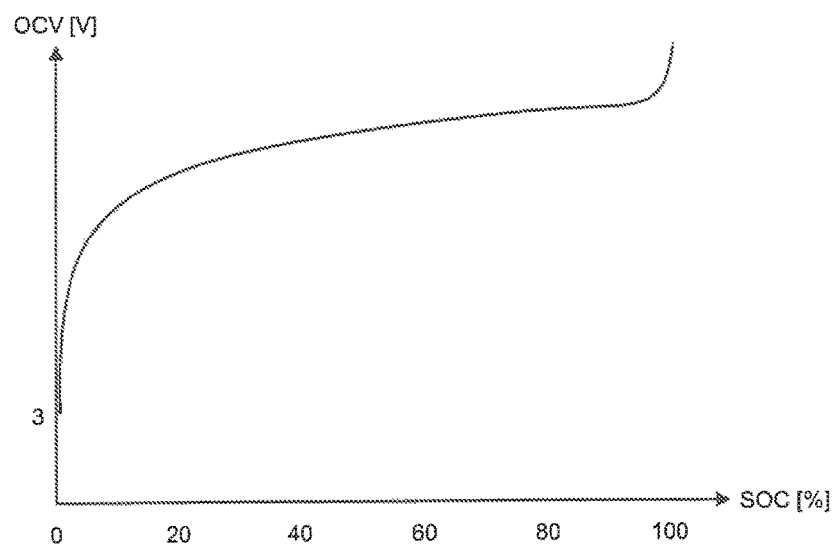
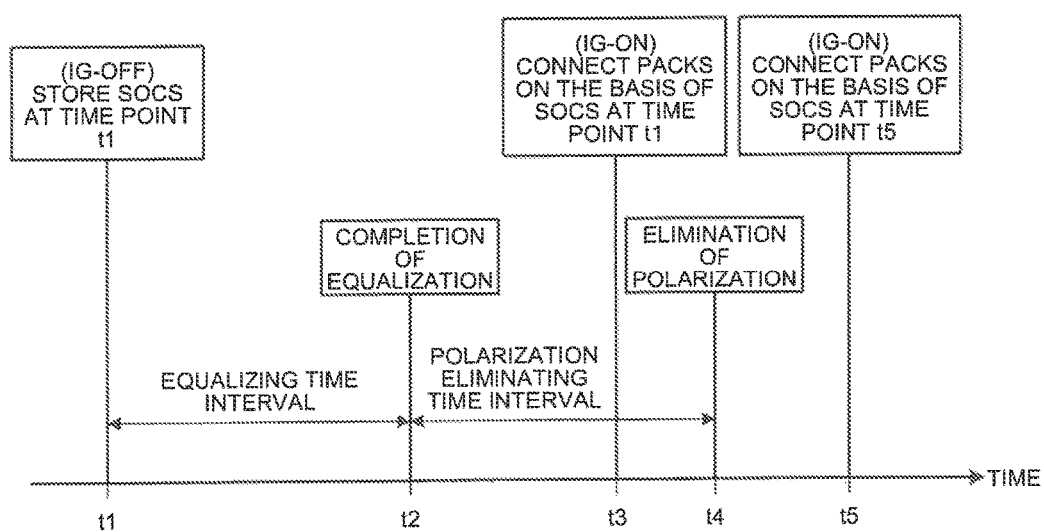

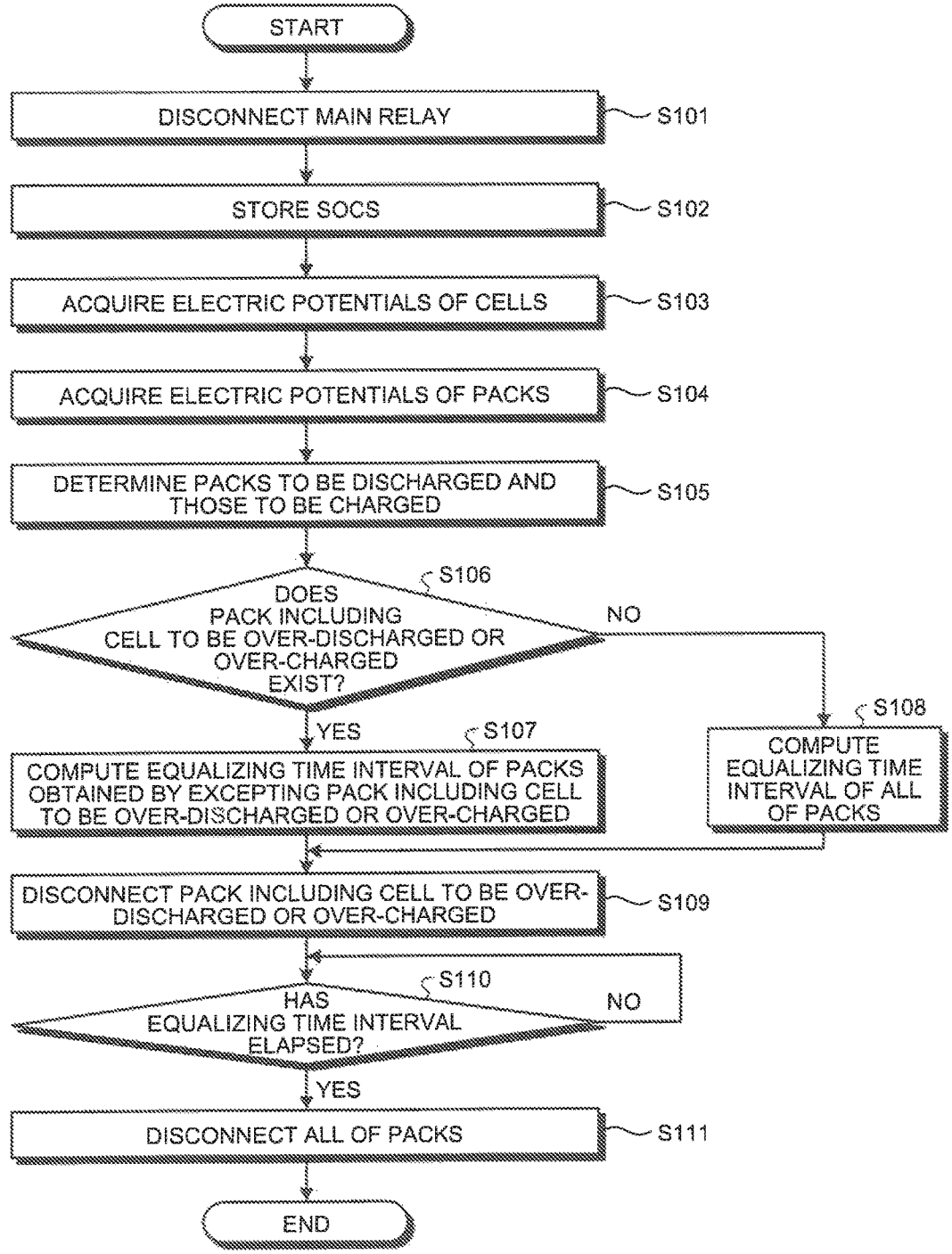

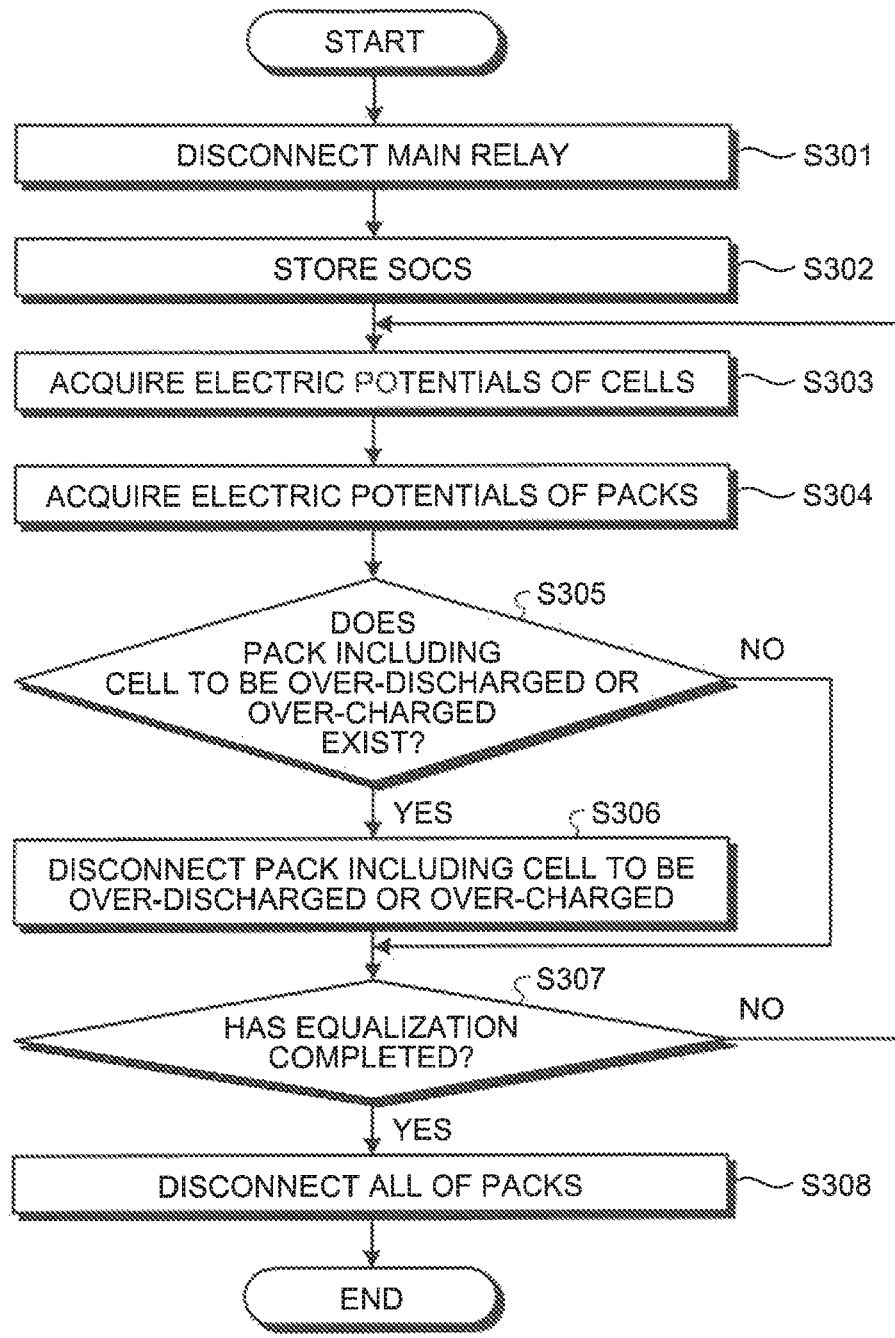

ELECTRIC STORAGE APPARATUS AND ELECTRIC-STORAGE CONTROLLING METHOD

CROSS-REFERENCE TO RELATED APPLICATION

This application is based upon and claims the benefit of priority of the prior Japanese Patent Application No. 2017-016274, filed on Jan. 31, 2017 the entire contents of which are incorporated herein by reference.

FIELD

The embodiment discussed herein is directed to an electric storage apparatus and an electric-storage controlling method.

BACKGROUND

Conventionally, there exists a battery apparatus that is obtained by connecting in parallel a plurality of storage batteries, each of which includes a plurality of electric storage elements connected in serial to have the high voltage, so as to realize increase in capacity. In a case where the plurality of storage batteries is connected in parallel, when electric-storage states of the storage batteries are different from each other, there exists in this electric storage apparatus a risk that a rush current flows from a storage battery having a high electric potential to a storage battery having a low electric potential, thereby leading to breakage.

Thus, there exists an electric storage apparatus that is provided in a hybrid automobile, for example, and connects in parallel a plurality of storage batteries through resistances when an ignition switch is turned OFF so as to equalize the electric potentials of the storage batteries while easing a rush current (see Japanese Laid-open Patent Publication No. 2013-240142, for example).

However, in the conventional electric storage apparatus, there exists in some cases a case where a part of the electric storage elements are over-charged or over-discharged when the plurality of the storage batteries is connected in parallel.

SUMMARY

An electric storage apparatus according to one aspect of an embodiment includes a battery unit, a determination unit, and a connection controlling unit. In the battery unit, a plurality of storage batteries is connected in parallel. Each of the storage batteries includes serially connected electric storage elements. The determination unit determines, on the basis of electric potentials of the storage batteries and the electric storage elements, (i) whether or not one or more storage batteries, of the storage batteries, to be discharged by connecting in parallel the storage batteries include one or more electric storage elements, of the electric storage elements, to be over-discharged and (ii) whether or not one or more storage batteries, of the storage batteries, to be charged by connecting in parallel the storage batteries include one or more electric storage elements, of the electric storage elements, to be over-charged. The connection controlling unit excepts, from targets to be equalized, the one or more storage batteries, determined by the determination unit, which include the one or more electric storage elements to be over-discharged or over-charged when connecting in parallel the storage batteries in a non-charge/discharge period of the battery unit to equalize the electric potentials of the storage batteries.

BRIEF DESCRIPTION OF DRAWINGS

A more complete appreciation of the present disclosure and many of the attendant advantages thereof will be readily obtained as the same becomes better understood by reference to the following detailed description when considered in connection with the accompanying drawings, wherein:

FIG. 3 is a functional block diagram illustrating the electric storage apparatus according to the embodiment;

FIG. 4 is a diagram illustrating an Open Circuit Voltage-State Of Charge characteristic (OCV-SOC characteristic) of each of packs according to the embodiment;

FIG. 5 is a diagram illustrating operations of the electric storage apparatus according to the embodiment;

FIGS. 6 and 7 are flowcharts illustrating processes to be executed by a controller of the electric storage apparatus according to the embodiment; and FIG. 8 is a flowchart illustrating processes to be executed by the controller of the electric storage apparatus according to the embodiment when the controller operates in a low power consumption mode.

DESCRIPTION OF EMBODIMENTS

Figure 1:
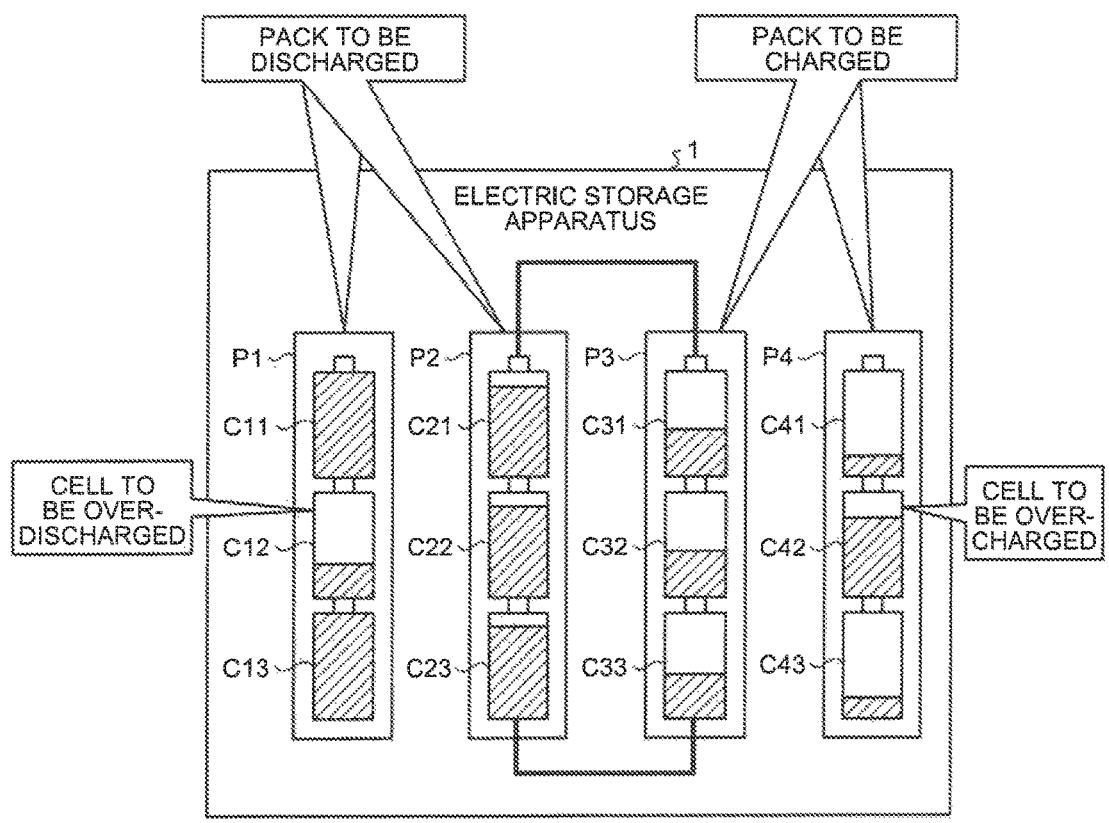
FIG. 1 is diagram illustrating an electric-storage controlling method according to an embodiment.

Hereinafter, an exemplary embodiment of an electric storage apparatus and an electric-storage controlling method disclosed in the present application will be described in detail with reference to the accompanying drawings. Moreover, it is not intended that the present disclosure be limited to the embodiment described below. First, the electric-storage controlling method according to the embodiment will be explained with reference to FIG. 1. FIG. 1 is diagram illustrating the electric-storage controlling method according to the embodiment.

As illustrated in FIG. 1, an electric storage apparatus 1 according to the embodiment includes a plurality of storage batteries P1, P2, P3, P4 (in this case, four batteries: hereinafter, may be referred to as "packs") to be connected in parallel. Hereinafter, when an arbitrary pack of the plurality of packs P1, P2, P3, P4 is be indicated, the pack may be referred to as a pack P.

The packs P individually includes a plurality of serially-connected electric storage elements (in this case, three electric storage elements: hereinafter, may be referred to as "cells") C11 to C13, C21 to C23, C31 to C33, C41 to C43. Hereinafter, when an arbitrary cell of the plurality of cells C11 to C13, C21 to C23, C31 to C33, C41 to C43 is to be indicated, the cell may be referred to as a cell C.

Each of the hatched parts illustrated in FIG. 1 indicates that the electric potential is higher as a hatched area is larger. A case will be explained in which the electric storage apparatus 1 includes the four packs P and each of the packs P includes the three cells C, however, the numbers of the packs P and the cells C are merely one example and are not limited thereto.

As illustrated in FIG. 1, the electric potentials of the packs P are in some cases different form one another when the electric storage apparatus 1 connects in parallel the plurality of packs P, during a time interval in which the electric storage apparatus 1 does not perform charge and discharge, for example, during a time interval in which an ignition switch is OFF, so as to equalize the electric potentials of the packs P. In the example illustrated in FIG. 1, the two packs P1, P2 on the left side are the packs P having the comparatively high electric potentials. On the other hand, the two packs P3, P4 on the right side are the packs P having the comparatively low electric potentials.

Thus, when these four packs P1 to P4 are to be connected in parallel, the two packs P1, P2 on the left side become the packs P to be discharged and the two packs P3, P4 on the right side become the packs P to be charged.

In this case, there exists, in any of the packs P to be discharged, the cell C having the electric potential that is lower than those of the other cells C in this pack P, in some cases. In the example illustrated in FIG. 1, the leftmost pack P1 is the pack P to be discharged, and the electric potential of the cell C12, which is second from the top in the pack P1, is lower than those of the other cells C11, C13. Therefore, when the four packs P1 to P4 are connected in parallel so that the leftmost pack P1 is discharged, there exists a fear that the cell C12, which is second from the top in the pack P1, is over-discharged.

There exists, in any of the packs P to be charged, the cell C having the electric potential that is higher than those of the other cells C in this pack P, in some cases. In the example illustrated in FIG. 1, the rightmost pack P4 is the pack P to be charged, and the electric potential of the cell C42, which is second from the top in the pack P4, is higher than those of the other cells C41, C43. Therefore, when the four packs P1 to P4 are connected in parallel so that the rightmost pack P4 is charged, there exists a fear that the cell C42, which is second from the top in the pack P4, is over-charged. The life of the pack P is shortened when the cell C frequently becomes over-charged or over-discharged.

Therefore, when connecting in parallel the four packs P1 to P4, the electric storage apparatus 1 acquires the electric potentials of the packs P to connect them in parallel, and determines the packs P1, P2 to be discharged and the packs P3, P4 to be charged on the basis of the electric potentials of the packs P.

Moreover, the electric storage apparatus 1 acquires the electric potentials of the cells C, and determines, on the basis of the acquired electric potentials of the cells C, whether or not the packs P1, P2 to be discharged include the cell C to be over-discharged and whether or not the packs P3, P4 to be charged include the cell C to be over-charged.

The electric storage apparatus 1 excepts, from targets to be equalized, the pack P1 including the cell C12 to be over-discharged and the pack P4 including the cell C42 to be over-charged, and turns, as indicated by bold lines in FIG. 1, the remaining two packs P2, P3 into a parallel-connected state to equalize the electric potentials of the packs P2, P3.

Thus, by employing the electric-storage controlling method according to the embodiment, it is possible to prevent the cells C from being over-charged or over-discharged when the plurality of packs P, each of which is obtained by connecting in serial the plurality of cells C, is connected in parallel.

Figure 2:
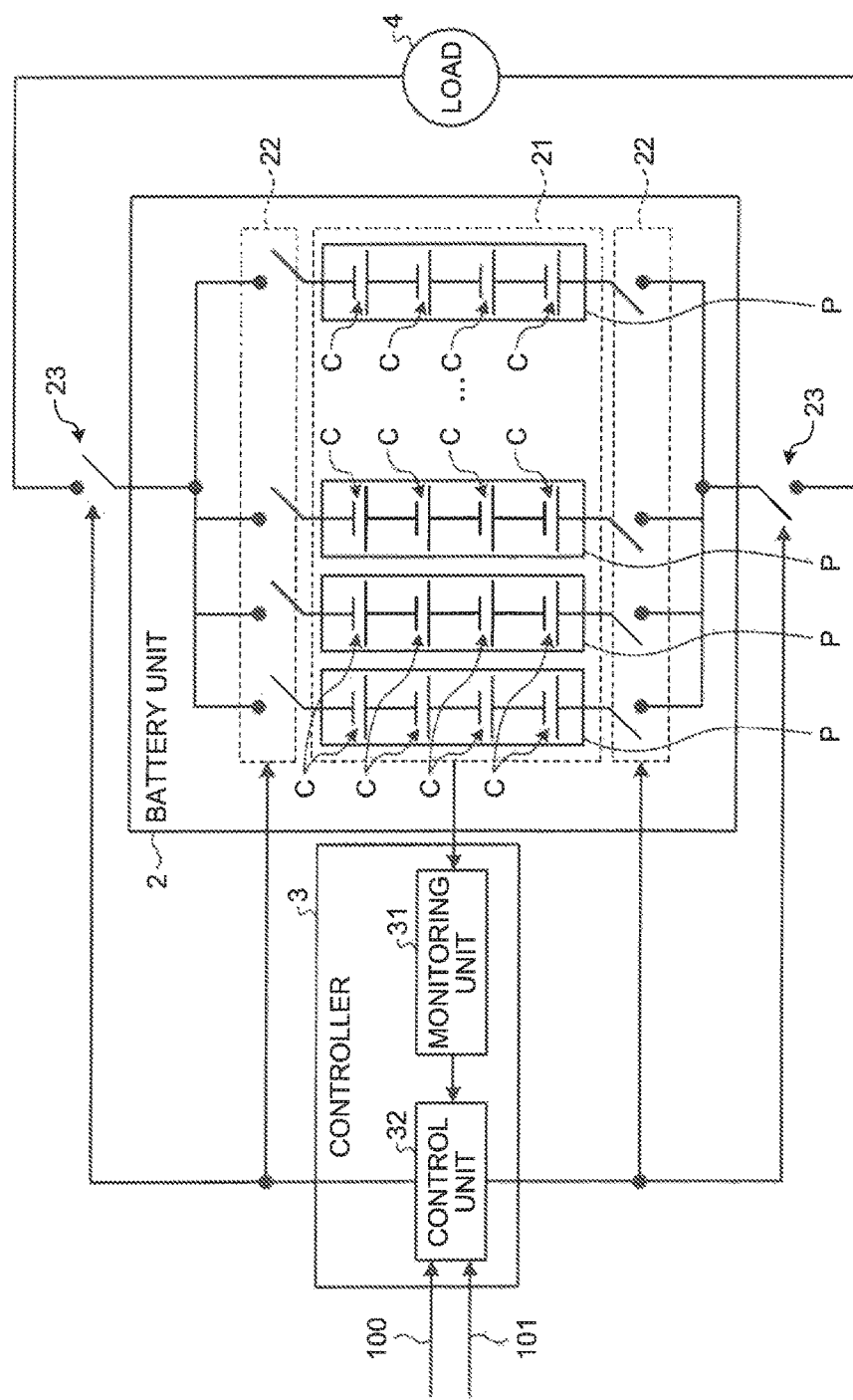
FIG. 2 is a diagram illustrating a configuration example of an electric storage apparatus according to the embodiment.

Next, a configuration example of the electric storage apparatus 1 according to the embodiment will be explained with reference to FIG. 2. FIG. 2 is a diagram illustrating a configuration example of the electric storage apparatus 1 according to the embodiment. A case will be explained as an example in which the electric storage apparatus 1 is provided in a hybrid automobile.

The electric storage apparatus 1 is discharged when supplying electric power to a load 4 such as a motor for driving a vehicle and another on-vehicle device, and is charged by regenerative energy generated when the vehicle decelerates. The electric storage apparatus 1 may be applied to an arbitrary electric storage system including a secondary battery, such as an electric automobile and a Home Energy Management System (HEMS).

As illustrated in FIG. 2, the electric storage apparatus 1 includes a battery unit 2, a controller 3, and a main relay 23. The battery unit 2 includes an electric storage unit 21 in which the plurality of packs to be connected in parallel is provided, and a sub-relay unit 22. Each of the packs P includes the plurality of cells C (for example, four cells) that are serially connected. The sub-relay unit 22 includes a plurality of sub-relays that is able to individually connect the plurality of packs P in parallel.

The controller 3 includes a monitoring unit 31 and a control unit 32. The monitoring unit 31 is realized by hardware such as an Application Specific Integrated Circuit (ASIC) and a Field Programmable Gate Array (FPGA). The monitoring unit 31 detects the electric potentials of the packs P and those of the cells C included in the packs P, and outputs the detected result to the control unit 32.

The control unit 32 includes, for example, a Central Processing Unit (CPU), a Read Only Memory (ROM), a Random Access Memory (RAM), a microcomputer including an input/output port, and various circuits. A part or a whole of the control unit 32 may be constituted of hardware such as an ASIC and a FPGA.

The control unit 32 is a processing unit for performing ON/OFF control on the main relay 23 and for performing ON/OFF control on each of the sub-relays included in the sub-relay unit 22. A termination signal 100 indicating that an ignition switch (hereinafter, may be referred to as "IG") is turned OFF and a startup signal 101 indicating that the IG is turned ON are input to this control unit 32 from the vehicle.

When the termination signal 100 is input, the control unit 32 controls the main relay 23 to disconnect the battery unit 2 and the load 4, which are connected with each other, so as to terminate charge or discharge performed by the battery unit 2. Next, the control unit 32 controls the sub-relay unit 22 on the basis of the electric potentials of the packs P and those of the cells C, which are input from the monitoring unit 31, and disconnects the pack P including the cell C to be over-charged or that to be over-discharged from the parallel connected packs P. Thus, the control unit 32 is able to equalize the electric potentials of the parallel-connected packs P while preventing the cell C from being over-charged or over-discharged.

When the startup signal 101 is input, the control unit 32 controls the sub-relay unit 22 to connect in parallel the plurality of packs P, next, controls the main relay 23 to connect the battery unit 2 and the load 4, and causes the battery unit 2 to start to perform charge or discharge.

Hereinafter, a configuration and operations of this control unit 32 will be more specifically explained with reference to FIGS. 3 to 5. FIG. 3 is a functional block diagram illustrating the electric storage apparatus 1 according to the embodiment. FIG. 4 is a diagram illustrating an Open Circuit Voltage-State Of Charge characteristic (OCV-SOC characteristic) of each of the packs P according to the embodiment.

FIG. 5 is a diagram illustrating operations of the electric storage apparatus 1 according to the embodiment. Note that in the following, among the configuration elements illustrated in FIG. 3, configuration elements that are the same as the configuration elements illustrated in FIG. 2 are represented with same symbols and the description is omitted appropriately.

As illustrated in FIG. 3, the control unit 32 includes a charge/discharge determining unit 51, an over-charge/over-discharge determining unit 52, a connection controlling unit 53, a computing unit 54, and a time counting unit 55. The CPU uses the RAM as a work area to execute an electric-storage controlling program (not illustrated) stored in the ROM to function them. The control unit 32 further includes a storage 6. The storage 6 is a RAM included in the control unit 32, for example, and stores SOCs 61, of the packs P, when charge or discharge performed by the battery unit 2 is terminated, namely, when the ignition switch is turned OFF.

The charge/discharge determining unit 51 acquires the electric potentials of the packs P from the monitoring unit 31 and connects in parallel the packs P so as to determine whether each of the packs P is to be discharged or to be charged on the basis of the electric potentials of the packs P. The charge/discharge determining unit 51 outputs, to the over-charge/over-discharge determining unit 52, information on the pack(s) P to be discharged and that on the pack(s) P to be charged. The charge/discharge determining unit 51 outputs, to the connection controlling unit 53, the electric potentials of the packs P acquired from the monitoring unit 31.

When information on the pack(s) P to be discharged and that on the pack(s) P to be charged are input from the charge/discharge determining unit 51, the over-charge/over-discharge determining unit 52 acquires the electric potentials of the cells C from the monitoring unit 31. The over-charge/over-discharge determining unit 52 determines whether or not the pack(s) P to be discharged includes the cell C to be over-discharged and whether or not the pack(s) P to be charged includes the cell C to be over-charged on the basis of the information input from the charge/discharge determining unit 51 and the electric potentials of the cells C.

When there exists the pack P including the cell C to be over-discharged or over-charged, the over-charge/over-discharge determining unit 52 outputs, to the connection controlling unit 53, information indicating the pack P including the cell C to be over-discharged or over-charged. When there does not exist the pack P including the cell C to be over-discharged or over-charged, the over-charge/over-discharge determining unit 52 outputs, to the connection controlling unit 53, information indicating the fact.

When the termination signal 100 is input from the vehicle, the connection controlling unit 53 cuts the main relay to terminate charge or discharge that are performed by the battery unit 2. In this case, when information indicating the pack P that includes the cell C to be over-discharged or to be over-charged is input from the over-charge/over-discharge determining unit 52, the connection controlling unit 53 excepts the pack P including the cell C to be over-discharged or to be over-charged from targets to be equalized, and outputs information indicating the remaining packs P to the computing unit 54.

The connection controlling unit 53 outputs, to the sub-relay unit 22, a control signal for turning states of the packs P except for the pack P including the cell C to be over-discharged or over-charged into parallel-connected ones. In other words, the connection controlling unit 53 disconnects the pack P including the cell C to be over-discharged or over-charged from the other parallel-connected packs P. Thus, the connection controlling unit 53 is able to equalize the electric potentials of the parallel-connected packs P while preventing the cell C from being over-charged or over-discharged.

When information indicating that there does not exist the pack P including the cell C to be over-discharged or over-charged is input from the over-charge/over-discharge determining unit 52, the connection controlling unit 53 outputs, to the computing unit 54, information that is input from the over-charge/over-discharge determining unit 52. The connection controlling unit 53 outputs, to the sub-relay unit 22, a control signal for turning states of all of the packs P into parallel-connected ones.

When information indicating the packs P other than the pack P including the cell C to be over-discharged or over-charged is input from the connection controlling unit 53, the computing unit 54 acquires, from the monitoring unit 31, the electric potentials of the packs P indicated by the input information. When information indicating that there does not exist the pack P including the cell C to be over-discharged or over-charged is input from the connection controlling unit 53, the computing unit 54 acquires the electric potentials of all of the packs P from the monitoring unit 31.

The computing unit 54 computes an equalizing time interval, which is from a termination of charge or discharge performed by the battery unit 2 to an equalization of the electric potentials of the packs P, on the basis of the electric potentials of the packs P to be connected in parallel, and outputs the equalizing time to the connection controlling unit 53.

When the termination signal 100 is input from the vehicle, the connection controlling unit 53 outputs to the time counting unit 55 a start instruction for causing the time counting unit 55 to start a time count. The connection controlling unit 53 has a function for periodically estimating, during a period in which the IG is ON, the SOCs of the packs P on the basis of information on the electric potentials, currents, etc. of the packs P by the known Coulomb counting etc.

When the termination signal 100 is input from the vehicle, in other words, when the IG is turned OFF, the connection controlling unit 53 stores SOCs 61 of the packs P at this time point in the storage 6. Note that an SOC estimating method such as the Coulomb count is known, and thus description thereof is omitted.

The time counting unit 55 includes a timer so as to start a time count when a start instruction is input from the connection controlling unit 53. In other words, the time counting unit 55 counts an elapsed time interval from a termination of charge or discharge performed by the battery unit 2, and outputs the counted elapsed time interval to the connection controlling unit 53.

When the elapsed time interval input from the time counting unit 55 reaches the equalizing time interval input from the computing unit 54, the connection controlling unit 53 outputs, to the sub-relay unit 22, a control signal for disconnecting all of the packs P connected in parallel.

Therefore, the connection controlling unit 53 is able to keep the equalized electric potential of the packs P until the next startup signal 101 is input, so that it is possible to reduce the number of the packs P that are not to be parallel-connectable due to a large potential difference when the battery unit 2 next starts to perform charge or discharge.

When the startup signal 101 is input from the vehicle, in other words, when the IG is turned ON, the connection controlling unit 53 acquires, from the time counting unit 55, an elapsed time interval (hereinafter, may be referred to as "OFF time interval") during which the battery unit 2 has not performed any charge and discharge. Next, the connection controlling unit 53 determines whether or not a time interval obtained by excepting an equalizing time interval from the acquired OFF time interval is equal to or more than a time interval (hereinafter, may be referred to as "polarization eliminating time interval") for eliminating polarizations of the packs P.

When determining that the time interval obtained by excepting the equalizing time interval from the acquired OFF time interval is less than the polarization eliminating time interval, in other words, when the IG is turned ON in a state where the polarization eliminating time interval of the packs P has not elapsed, the connection controlling unit 53 outputs, to the sub-relay unit 22, a control signal for sequentially connecting in parallel the packs P having the SOCs 61 within a predetermined range or predetermined ranges with each other on the basis of the SOCs 61 when the IG is OFF that are stored in the storage 6.

When determining that the time interval obtained by excepting the equalizing time interval from the acquired OFF time interval is equal to or more than the polarization eliminating time interval, regarding the electric potentials of the packs P at this time point as OCVs because the electric potentials of the packs P are able to be regarded as the correct OCVs at this time point, the connection controlling unit 53 outputs, to the sub-relay unit 22, a control signal for sequentially connecting in parallel the packs P having the SOCs within a predetermined range with each other, on the basis of SOCs derived on the basis of the OCV-SOC characteristic (see FIG. 4) of the respective packs P stored in the ROM. The OCV-SOC characteristic is obtained by associating the OCV and the SOC with each other.

For example, as illustrated in FIG. 5, when the IG is turned OFF at a time point t1, the connection controlling unit 53 stores the SOCs 61 at the time point t1. Next, when the equalizing time interval has elapsed to complete equalization of the packs P at a time point t2 and the polarization eliminating time interval has further elapsed to eliminate polarizations of the packs P at a time point t4, there exists, in some cases, a case where the IG is turned ON at a time point t3 between the time points t2 and t4.

In this case, the polarizations of the packs P are not eliminated at the time point t3 and the electric potentials of the packs P are not able to be regarded as OCVs, and thus the connection controlling unit 53 is not able to derive precise SOCs from the electric potentials of the packs P at the time point t3 on the basis of the OCV-SOC characteristic illustrated in FIG. 4.

Thus, when the IG is turned ON at the time point t3, the connection controlling unit 53 connects in parallel the packs P on the basis of the SOCs 61 at the time point t1 that are stored in the storage 6. Thus, the connection controlling unit 53 is able to connect in parallel the packs P in a connection order for not causing overcurrent to flow into the electric storage unit 21, which is more appropriate than that in a case where the packs P are connected on the basis of SOCs derived from the electric potentials of the packs P at the time point t3.

The SOC estimation by the Coulomb method etc., which is performed in an interval during which the IG is ON, may be performed until a time when the equalization is completed, and, the SOCs 61 of the time point t1 when the IG is turned OFF are not stored, but the SOCs 61 of the time point t2 when the equalization is completed may be stored. In this case, SOC to be used at the time point t3 is the SOC 61 stored at the time point t2.

When the IG is turned ON at a time point t5 that is after the time point t4 when a polarization of the packs P is completed, because the polarization of the packs P is eliminated at the time point t5 and the electric potentials of the packs P are able to be regarded as OCVs, the connection controlling unit 53 is able to derive precise SOCs from the electric potentials of the packs P at the time point t5.

When the IG is turned ON at the time point t5, the connection controlling unit 53 connects in parallel the packs P in a connection order based on the SOCs derived from the electric potentials of the packs P at this time point. Thus, the connection controlling unit 53 is able to connect in parallel the packs P in an appropriate connection order in which overcurrent does not flow in the electric storage unit 21.

When parallel connection of the packs P is completed, the connection controlling unit 53 outputs a control signal to the main relay 23 so as to turn ON the main relay 23, connects the battery unit 2 with the load 4, and causes the battery unit 2 to start charge or discharge.

As described above, the controller 3 preliminary determines the pack P including the cell C to be over-discharged or to be over-charged to except it from targets to be equalized, computes an equalizing time interval of the remaining packs P, and disconnects all of the packs P after the equalizing time interval has elapsed.

Thus, the controller 3 is able to except, from targets to be equalized, the cell C to be over-discharged or to be over-charged at a start of the equalization, so that it is possible to safely equalize the electric potentials of the packs P. Note that control to be performed by the controller 3 is not limited thereto.

For example, the controller 3 may be configured to monitor the electric potentials of the pack P and the cells C in a time interval during which the electric potentials of the packs P are equalized so as to disconnect, at a time point when any of the cells C is determined to be over-discharged or to be over-charged, the pack P including this cell C from the other packs P in equalizing.

When this configuration is employed, the controller 3 continuously monitors the electric potentials of the packs P and the cells C after the disconnection of the pack P including the cell C to be over-discharged or to be over-charged, and disconnects all of the connected packs P when the electric potentials of the packs P are equalized.

Thus, by employing the controller 3, a process for computing an equalizing time interval and a process for counting a time interval until the equalizing time interval is elapsed are able to be omitted, so that it is possible to simplify process and reduce the processing load. One example of the process for performing this control will be mentioned later with reference to FIG. 8.

Figure 7:
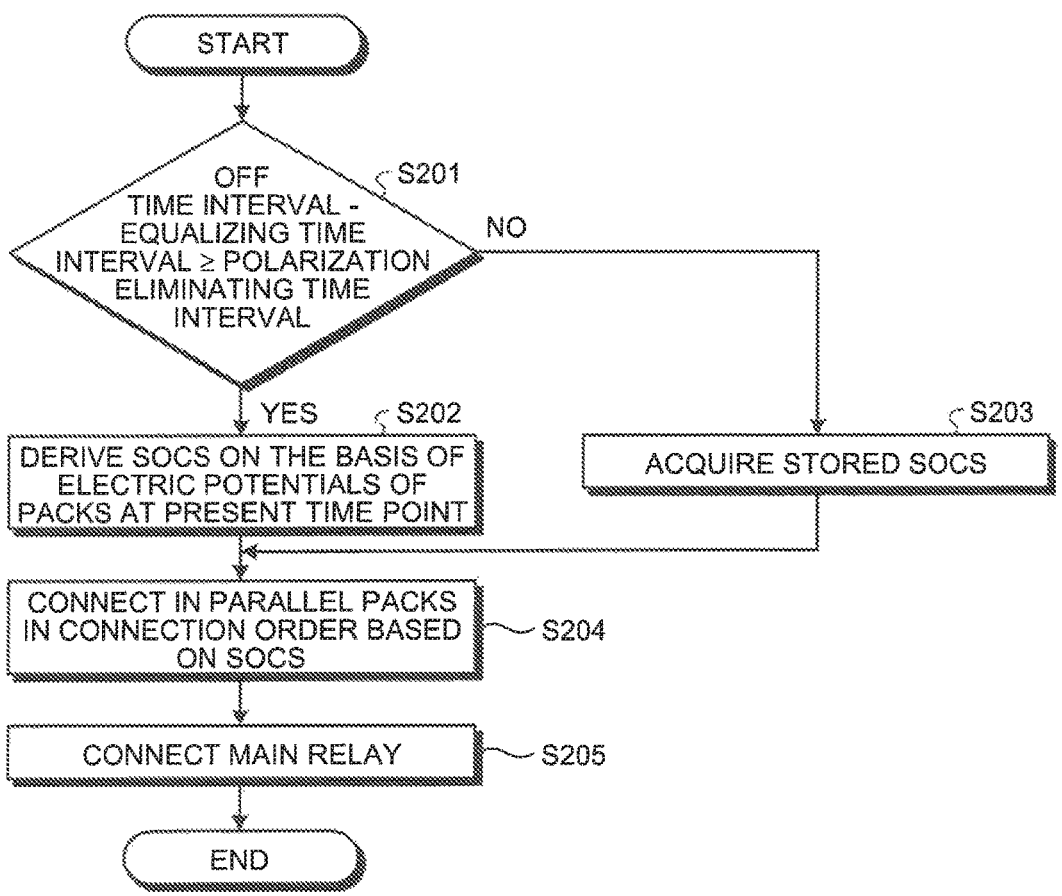

Next, the process to be executed by the controller 3 of the electric storage apparatus 1 will be explained with reference to FIGS. 6 and 7. FIGS. 6 and 7 are flowcharts illustrating processes to be executed by the controller 3 of the electric storage apparatus 1 according to the embodiment.

When the termination signal 100 is input from the vehicle, the controller 3 executes the processes illustrated in FIG. 6. Specifically, when the termination signal 100 is input from the vehicle, the controller 3 first disconnects the main relay 23 (Step S101). Next, the controller 3 stores, in the storage 6, the SOCs 61 of the packs at this time point that are estimated by the Coulomb method and the like (Step S102).

Next, the controller 3 acquires the electric potentials of the cells C (Step S103), and acquires the electric potentials of the packs P (Step S104). Next, the controller 3 determines, on the basis of the electric potentials of the packs P, the packs P to be discharged and the packs P to be charged by connecting in parallel all of the packs P (Step S105).

Next, the controller 3 determines whether or not there exists the pack P including the cell C to be over-discharged or over-charged on the basis of the electric potentials of the cells C (Step S106). When determining that there exists the pack P including the cell C to be over-discharged or over-charged (Step S106: Yes), the controller 3 shifts the process to Step S107. When determining that there does not exist the pack P including the cell C to be over-discharged or over-charged (Step S106: No), the controller 3 shifts the process to Step S108.

In Step S107, the controller 3 computes an equalizing time interval until the electric potentials of the packs P, which are obtained by excepting the pack P including the cell C to be over-discharged or over-charged, are equalized, and shifts the process to Step S109. In Step S108, the controller 3 computes an equalizing time interval until the electric potentials of all of the packs P are equalized, and shifts the process to Step S109.

In Step S109, the controller 3 disconnects the pack P including the cell C to be over-discharged or over-charged. Next, the controller 3 determines whether or not the equalizing time interval computed in Step S107 or Step S108 has elapsed (Step S110).

When determining that the equalizing time interval has not elapsed (Step S110: No), the controller 3 repeatedly executes the determination process of Step S110 until the equalizing time interval has elapsed. When determining that the equalizing time interval has elapsed (Step S110: Yes), the controller 3 disconnects all of the packs P connected in parallel (Step S111), and terminates the process.

Next, when the startup signal 101 is input from the vehicle, the controller 3 executes processes illustrated in FIG. 7. Specifically, as illustrated in FIG. 7, when the startup signal 101 is input from the vehicle, the controller 3 determines whether or not a time interval obtained by subtracting the equalizing time interval computed in Step S107 or S108 from an OFF time interval is equal to or more than the polarization eliminating time interval (Step S201).

When determining that the time interval obtained by subtracting the equalizing time interval from the OFF time interval is equal to or more than the polarization eliminating time interval (Step S201: Yes), the controller 3 derives the SOCs of the packs P on the basis of the electric potentials of the packs P at the present time point (Step S202), and shifts the process to Step S204.

When determining that the time interval obtained by subtracting the equalizing time interval from the OFF time interval is less than the polarization eliminating time interval (Step S201: No), the controller 3 acquires the SOCs 61 stored in the storage 6 (Step S203), and shifts the process to Step S204.

In Step S204, the controller 3 connects in parallel the packs P in a connection order based on the SOCs derived in Step S202 or the SOCs 61 acquired in Step S203. Next, the controller 3 connects the main relay 23 (Step S205), and terminates the process.

As described above, the controller 3 may monitor the electric potentials of the packs P and the cells C during a time interval for equalizing the electric potentials of the packs P, and may disconnect, at a time point when the cell C is determined to be over-discharged or over-charged, the pack P including this cell C from the other packs P in equalizing.

The controller 3 may continuously monitor the electric potentials of the packs P and the cells C after the disconnection of the pack P including the cell C to be over-discharged or over-charged, when the electric potentials of the packs P are equalized, and may disconnect all of the connected packs P. When performing this control, the controller 3 may operate in a low power consumption mode, for example.

In a case where the controller 3 operates in a low power consumption mode, when the termination signal 100 is input from the vehicle, the controller 3 executes the process illustrated in FIG. 8. FIG. 8 is a flowchart illustrating processes to be executed by the controller 3 of the electric storage apparatus 1 according to the embodiment when the controller 3 operates in the low power consumption mode.

As illustrated in FIG. 8, in a case where the controller 3 operates in the low power consumption mode, when the termination signal 100 is input from the vehicle, the controller 3 first disconnects the main relay 23 (Step S301). Next, the controller 3 stores in the storage 6 the SOCs 61 of the packs at the time point estimated by the Coulomb method and the like (Step S302). Next, the controller 3 acquires the electric potentials of the cells C (Step S303), and acquires the electric potentials of the packs P (Step S304).

Next, the controller 3 connects in parallel the packs P to determine, on the basis of the electric potentials of the packs P and the cells C, whether or not there exists the pack P including the cell C to be over-discharged or over-charged (Step 3305).

When determining that there does not exist the pack P including the cell C to be over-discharged or over-charged (Step S305: No), the controller 3 shifts the process to Step S307. When determining that there exists the pack P including the cell C to be over-discharged or over-charged (Step S305: Yes), the controller 3 disconnects the pack P connected in parallel including the cell C to be over-discharged or over-charged (Step S306), and shifts the process to Step S307.

In Step S307, the controller 3 determines whether or not the equalization has completed on the basis of the electric potentials of the packs P. When determining that the equalization has not completed (Step S307: No), the controller 3 shifts the process to Step S303.

When determining that the equalization has completed (Step S307: Yes), the controller 3 disconnects all of the packs P connected in parallel (Step S308), and terminates the process.

Thus, by employing the controller 3, the process for computing the equalizing time interval and the process for counting the time interval until the equalizing time interval has elapsed are able to be omitted, so that it is possible to simplify the process and reduce the processing load.

In this case, the above OFF time interval is counted as an time interval elapsed from execution of the process of S111 in which the equalization is completed. When this elapsed time interval is equal to or more than the polarization eliminating time interval, the process of Step S202 illustrated in FIG. 7 is executed, when this elapsed time interval is equal to or less than the polarization eliminating time interval, the process of Step S203 is executed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An electric storage apparatus comprising:
a battery unit in which a plurality of storage batteries are configured to be connected in parallel, each of the plurality of storage batteries including serially connected electric storage elements;
a determination unit that determines, based on electric potentials of the plurality of storage batteries and the electric storage elements;
(i) whether or not one or more storage batteries to be discharged by connecting in parallel the plurality of storage batteries include one or more electric storage elements, of the electric storage elements, to be over-discharged, and
(ii) whether or not one or more storage batteries to be charged by connecting in parallel the plurality of storage batteries include one or more electric storage elements, of the electric storage elements, to be over-charged; and
a connection controlling unit that excludes, from target storage batteries to be equalized, (i) the one or more storage batteries to be discharged, which are determined by the determination unit to include the one or more electric storage elements to be over-discharged and (ii) the one or more storage batteries to be charged, which are determined by the determination unit to include the one or more electric storage elements to be over-charged, when connecting in parallel the plurality of storage batteries in a non-charge/discharge period of the battery unit to equalize the electric potentials of the plurality of storage batteries.

2. The electric storage apparatus according to claim 1, wherein
when charge or discharge performed by the battery unit is terminated, the determination unit determines:
(i) whether or not the one or more storage batteries to be discharged include the one or more electric storage elements to be over-discharged, and
(ii) whether or not the one or more storage batteries to be charged include the one or more electric storage elements to be over-charged.

3. The electric storage apparatus according to claim 1, wherein
the determination unit determines, in a time interval for equalizing the electric potentials of the plurality of storage batteries;
(i) whether or not the one or more storage batteries to be discharged include the one or more electric storage elements to be over-discharged, and
(ii) whether or not the one or more storage batteries to be charged include the one or more electric storage elements to be over-charged.

4. The electric storage apparatus according to claim 1, further comprising:
a computing unit that computes an equalizing time interval from a time point at which charge or discharge performed by the battery unit is terminated to a time point at which the electric potentials of the plurality of storage batteries are equalized; and
a time counting unit that counts an elapsed time interval from the time point at which the charge or the discharge performed by the battery unit is terminated, wherein the connection controlling unit disconnects all of the plurality of storage batteries connected in parallel when the equalizing time interval has elapsed from a time point at which the time counting unit starts to count the elapsed time interval.

5. The electric storage apparatus according to claim 4, wherein
in a case where the charge or the discharge to be performed by the battery unit is started;
when a time interval obtained by excepting the equalizing time interval from the elapsed time interval is equal to or more than a time interval for eliminating polarization of the plurality of storage batteries, the connection controlling unit connects in parallel the plurality of storage batteries in a connection order based on charge states of the plurality of storage batteries.

6. The electric storage apparatus according to claim 4, further comprising:
a storage that stores charge states of the plurality of storage batteries when the charge or the discharge performed by the battery unit is terminated, wherein
in a case where the charge or the discharge to be performed by the battery unit is started;
when a time interval obtained by excepting the equalizing time interval from the elapsed time interval is less than a time interval for eliminating polarization of the plurality of storage batteries, the connection controlling unit connects in parallel the plurality of storage batteries in a connection order based on the charge states stored in the storage.

7. An electric-storage controlling method to be executed by a computer, the method comprising:
while a plurality of storage batteries are configured to be connected in parallel in a battery unit, and each of the plurality of storage batteries includes serially connected electric storage elements;
determining, based on electric potentials of the plurality of storage batteries and the electric storage elements;
(i) whether or not one or more storage batteries to be discharged by connecting in parallel the plurality of storage batteries include one or more electric storage elements, of the electric storage elements, to be over-discharged, and
(ii) whether or not one or more storage batteries to be charged by connecting in parallel the plurality of storage batteries include one or more electric storage elements, of the electric storage elements, to be over-charged; and
excluding, from target storage batteries to be equalized, (i) the one or more storage batteries to be discharged, which are determined in the determining, to include the one or more electric storage elements to be over-discharged and (ii) the one or more storage batteries to be charged, which are determined in the determining to include the one or more electric storage elements to be over-charged, when connecting in parallel the plurality of storage batteries in a non-charge/discharge period of the battery unit to equalize the electric potentials of the plurality of storage batteries.

* * * * *